United States Patent Office 3,156,742
Patented Nov. 10, 1964

3,156,742
STABILIZED ACRYLONITRILE POLYMER
COMPOSITIONS
Terry W. Tarkington, Decatur, and Carlton D. Whitt, Athens, Ala., assignors, by mesne assignments, to Monsanto Company, a corporation of Delaware
No Drawing. Filed Feb. 17, 1961, Ser. No. 89,926
16 Claims. (Cl. 260—89.5)

This invention relates to the stabilization of acrylonitrile polymers and compositions thereof. More particularly, it relates to the stabilization of acrylonitrile polymers and compositions thereof which have a tendency to develop undesirable color when exposed to either natural sunlight or various types of artificial light.

Fibers, filaments and other shaped articles produced from acrylonitrile polymers have a tendency to develop a considerable color change when exposed to either natural sunlight or various types of artificial light. This color change in the case of fibers occurs when the fibers are in either the bleached or the unbleached state and gives an unstable background color for the fiber either in dyed or undyed textile end uses.

The mechanism which causes color changes has not been definitely ascertained, although it is thought to be fairly well established. Sunlight, and to a lesser extent artificial light, contains not only visible light but also infra-red and ultra-violet radiations. The absorption of light causes changes mainly manifest in a deterioration of fiber properties, such as tensile strength and color fastness. This absorption and resultant photo-chemical degradation usually proceeds very slowly for most undyed articles, possibly due to less absorption of ultra-violet radiations. However, the color of articles made from bleached undyed fiber must be stable to light and not show a change in color which is primarily an undesirable darkening effect. The presence of certain types of dyes markedly increases the rate of degradation and reduces the working life of the fiber. The dye seems to be able to pass the absorbed light energy on to effect a quicker destruction of the fiber molecules. Dyed materials are faded by absorbed visible and ultra-violet radiation up to a critical wave length and above this point, radiation is non-actinic even if it is strongly absorbed. Some dyes also have a synergistic effect on other dyes even though the individual dyes may be acceptable when used alone. Textile auxiliary materials may also have a synergistic effect on some dyes. The net result of this is that the dyer is not only confused about which dyes and auxiliary agents to use but also has a much more limited range of dyes and textile auxiliary agents that he can work with. Even though some dyes can be found which do not accelerate this photo-degradation, the background color change in the fiber due to the photo-degradation, even with these dyes, is enough to cause undesirable color changes in the dyed article. Whatever the reason for color changes, it results in compositions and products of undesirable standards and therefore, any light stabilizing agents which would reduce this color change upon light exposure would be highly desirable.

Accordingly, it is an object of the present invention to minimize undesirable color formation in acrylonitrile polymers and compositions thereof. Another object is to minimize undesirable color changes in acrylic fibers. It is also an object of the invention to provide solutions of acrylonitrile polymers and articles produced therefrom having improved color characteristics by the addition of an alkyl or aromatic substituted pyridine to the acrylonitrile polymer solution or to the fiber finish bath. Other objects and advantages will be apparent from a consideration of the description of the invention which follows hereinafter.

In general, the objects of the invention are accomplished by adding as a light stabilizing agent, a small amount of an alkyl or aromatic substituted pyridine to an acrylonitrile polymer solution or to the finish bath. This stabilizing agent present in the polymer is likewise present in the shaped articles produced therefrom and minimizes or prevents the development of objectionable color occurring on exposure of the shaped articles to natural sunlight or artificial light.

The total amount of stabilizing agent which may be employed may range from about 0.05 to 5.0 percent based on the total weight of the polymer. However, it is preferred to employ from about 0.1 to 2.0 percent by weight to give the best light stabilizing action. The stabilizing agent may be added to the spinning solution or to the finish bath by any suitable means.

The compositions of the instant invention may be prepared in a varying temperature range. Thus the compositions may be prepared by mixing the polymer, a suitable solvent, and the stabilizing agent at any suitable temperature and thereafter heating the mixture up to the boiling point of the solvent to insure complete dissolution of the polymer.

Any polyacrylonitrile solvent may be used in practicing the instant invention. Among the solvents preferably suitable are N,N-dimethylformamide, N,N-dimethylacetamide, ethylene carbonate, dimethyl sulfoxide, nitromethane, gamma-butyrolactone, aqueous zinc chloride, aqueous solutions of sodium thiocyanate, sulfuric acid, aqueous solutions of nitric acid, and the like. These solvents generally function as solvents for acrylonitrile polymers at temperatures of from about 25° C. to the boiling point of the polymer solvent mixtures.

The alkyl and aromatic substituted pyridines of this invention may contain up to 12 carbon atoms in the substituting radical or radicals. As examples of such compounds there may be named 2-methyl-5-ethyl pyridine, 3-ethyl-4-methyl pyridine, 2,6-dimethyl-3-ethyl pyridine, 2-butyl pyridine, 2-benzyl pyridine, 3-benzyl pyridine, dimethyl pyridine, 2-ethyl pyridine, 3-ethyl pyridine, 2-ethyl-3,5-dimethyl pyridine, 5-ethyl-2-methyl pyridine, 2-phenyl pyridine, 2-propyl pyridine, 2,4,6-trimethyl pyridine and the like.

The use of these stabilizing agents, in accordance with the present invention, effects improvements in color characteristics in all solutions of acrylonitrile polymers and articles produced therefrom. The invention is applicable not only to polyacrylonitrile, but also to copolymers, interpolymers and blends thereof, particularly those containing at least 80 percent by weight of polymerized or copolymerized acrylonitrile. Such polymeric materials include acrylonitrile fiber-forming polymers with readily dyeable basic copolymers, the blend having an overall polymerized acrylonitrile content of at least 80 percent by weight.

For example the polymer may be a copolymer of from 80 to 98 percent of acrylonitrile and from 2 to 20 percent of another copolymerizable mono-olefinic monomer. Suitable copolymerizable mono-olefinic monomers include acrylic, alphachloroacrylic and methacrylic acids, the acrylates, such as methylmethacrylate, ethylmethacrylate, butylmethacrylate, methoxy-methyl methacrylate, beta-chloroethyl methacrylate, and the corresponding esters of acrylic and alphachloroacrylic acids; vinyl chloride, vinyl fluoride, vinyl bromide, vinylidene chloride, 1-chloro-1-bromoethylene; methacrylonitrile; acrylamide and methacrylamide; alpha-chloroacrylamide, or monoalkyl substitution products thereof; methyl vinyl ketone; vinyl carboxylates, such as vinyl acetate, vinyl chloroacetate, vinyl propionate, and vinyl stearate; N-vinylimides, such as N-vinylphthalimide and N-vinylsuccinimide; methylene malonic esters, itaconic acid and itaconic ester; N-vinyl carbazole vinyl furan; alkyl vinyl esters; vinyl sulfonic acid, ethylene alpha, beta-dicarboxylic acids or their anhydrides or derivatives, such as diethyl citraconate, diethylmesaconate; styrene; vinyl naphthalene; vinyl-substituted tertiary heterocyclic amines such as the vinylpyridines and alkyl-substituted vinylpyridines for example, 2-vinylpyridine, 4-vinylpyridine, 2-methyl-5-vinylpyridine, and the like; 1-vinylimidazole and alkyl-substituted 1-vinyl-imidazoles, such as 2-, 4-, or 5-methyl-1-vinylimidazole, vinylpyrrolidone, vinylpiperidone, and other mono-olefinic copolymerizable monomeric materials.

The polymer can be a ternary interpolymer, for example, products obtained by the interpolymerization of acrylonitrile and two or more of any of the monomers, other than acrylonitrile, enumerated above. More specifically, and preferably, the ternary polymers contain from 80 to 98 percent of acrylonitrile, from 1 to 10 percent of a vinylpyridine or a 1-vinyl-imidazole, and from 1 to 16 percent of another copolymerizable mono-olefinic substance, such as methacrylonitrile, vinyl acetate, methylmethacrylate, vinyl chloride, vinylidene chloride, and the like.

The polymer can also be a blend of polyacrylonitrile or a copolymer of from 30 to 99 percent acrylonitrile and from 1 to 20 percent of at least one other mono-olefinic copolymerizable monomeric substance with from two to fifty percent of the weight of the blend of a copolymer of from 30 to 90 percent of a vinyl substituted tertiary heterocyclic amine and from 10 to 70 percent of at least one other mono-olefinic copolymerizable monomer. Preferably, when the polymeric material comprises a blend, it will be a blend of from 80 to 99 percent of a copolymer of 80 to 98 percent acrylonitrile and from 2 to 20 percent of another mono-olefinic monomer, such as vinylacetate, which is not receptive to dyestuff, with from 1 to 20 percent of a copolymer of from 30 to 90 percent of a vinyl substituted tertiary heterocyclic amine, such as a vinylpyridine, a 1-vinylimidazole or a vinyl lactam, and from 10 to 70 percent of acrylonitrile to give a dyeable blend having an overall vinyl-substituted tertiary heterocyclic amine content of from 2 to 10 percent, based on the weight of the blend.

While the preferred polymers employed in the instant invention are those containing at least 80 percent acrylonitrile, generally recognized as the fiber-forming acrylonitrile polymers, it will be understood that the invention is likewise applicable to polymers containing less than 80 percent of acrylonitrile. Polymers containing less than 80 percent acrylonitrile are useful in forming fibers, lacquers, coating compositions and molded articles, in all of which applications light stabilization is important.

The polymers, useful in the practice of the present invention, may be prepared by any conventional polymerization procedures, such as mass polymerization methods, solution polymerization methods, or aqueous emulsion procedures. The articles manufactured from the solutions formed therewith may be produced by well-known conventional methods, for example, the wet-spinning method for producing fibers. If it is desired to produce shaped articles from the acrylonitrile polymer solutions of the present invention which have a modified appearance or modified properties, various agents may be added to the solutions to accomplish these effects prior to the fabrication of the articles without any ill effects thereon. Such added agents might be pigments, dyes, anti-static agents, fire-retarding agents, etc.

In order to simulate exposure to natural sunlight, the acrylic fiber samples in the examples of this invention were exposed for 20 Standard Fade-Ometer hours in an Atlas Fade-Ometer by the methods recommended by the Technical Manual of the American Association of Textile Chemists and Colorists, in the annual issue for 1957 published by the Howes Publishing Co., 44 E. 23rd Street, New York city.

The tests for color indicative of bleached light stability used throughout the examples which follow consist of measurement of purity and brightness as calculated from the tristimulus values determined on a General Electric spectrophotometer by the methods recommended by the Standard Observer and Coordinate System of the International Commission on Illumination, as fully set forth in the Handbook of Colorimetry, published by the Technology Press, Massachusetts Institute of Technology, in 1936.

The instant invention is further illustrated by the following specific examples, in which all proportions and percentages are by weight unless otherwise specified.

EXAMPLE I 19.5 kilograms of a copolymer of 94 percent acrylonitrile and 6 percent vinyl acetate were added to 60 kilograms of N,N-dimethylacetamide and 141 grams of titanium dioxide. The mixture was stirred, 0.39 kilogram of 2-methyl-5-ethylpyridine added, and heated to put the polymer in solution. The resultant solution was then wet spun into a fiber. At the same time a control sample fiber was produced. Changes in the values for purity and brightness of the control fiber and the stabilized fiber are set forth in Table I below.

*Table I*

| Percent Stabilizer Based on Fiber Weight | Bleached Light Stability | |
| --- | --- | --- |
| | Δ Brightness | Δ Purity |
| Control | 13.7 | 10.8 |
| 2-0 2-methyl-5-ethylpyridine | 4.0 | 5.2 |

EXAMPLE II

An acrylonitrile-vinyl acetate copolymer solution was prepared as in Example I with 2-methyl-5-ethylpyridine added to the solution at a rate equivalent to 0.5 percent. Table II shows changes in the values for purity and brightness of the control fiber and the stabilized fiber.

*Table II*

| Percent Stabilizer Based on Fiber Weight | Bleached Light Stability | |
| --- | --- | --- |
| | Δ Brightness | Δ Purity |
| Control | 11.9 | 10.6 |
| 0.5 2-methyl-5-ethylpyridine | 6.9 | 6.9 |

As many apparently widely different embodiments of this inveniton may be made without departing from the spirit and scope thereof, it is to be understood that the same is not to be limited to the specific embodiments thereof except as defined in the appended claims.

We claim:

1. A new composition of matter comprising a polymer containing in polymerized form at least 80 percent of acrylonitrile and up to 20 percent of at least one copolymerized mono-olefinic monomer and, as a light stabilizing agent from 0.05 to 5.0 percent, based on the weight of the polymer, of a compound taken from the group consisting of alkyl C-substituted pyridines having 1 to 12 carbon atoms in the substituents and aromatic C substituted pyridines having 6 to 12 carbon atoms in the substituents.

2. A new composition of matter as defined in claim 1 wherein the polymer is polyacrylonitrile.

3. A new composition of matter as defined in claim 1 wherein the polymer is a copolymer comprising at least 80 percent of acrylonitrile and up to 20 percent of vinyl acetate.

4. A new composition of matter as defined in claim 1 wherein the polymer is a blend of 80 to 99 percent of (A) a copolymer containing from 80 to 98 percent of acrylonitrile and 2 to 20 percent of vinyl acetate and 1 to 20 percent of (B) a copolymer containing 10 to 70 percent of acrylonitrile and 30 to 90 percent of 2-methyl-5-vinylpyridine, said blend being so proportioned that the 2-methyl-5-vinylpyridine comprises from 2 to 10 percent by weight of blend.

5. A new composition of matter comprising a copolymer having at least 80 percent of acrylonitrile and up to 20 percent of vinyl acetate, dissolved in a solvent therefore, and, as a light stabilizing agent from 0.5 to 2.0 percent of 2-methyl-5-ethylpyridine based on the total weight of the polymer solution.

6. A new composition of matter comprising a polymer blend of (A) a copolymer containing 80 to 98 percent of acrylonitrile and 2 to 20 percent of another copolymerizable mono-olefinic monomer and (B) a copolymer containing 10 to 70 percent of acrylonitrile and 30 to 90 percent of a vinyl-substituted teritiary heterocyclic amine, said blend having an overall vinyl-substituted tertiary heterocyclic amine content of from 2 to 10 percent based on the weight of the blend, dissolved in a solvent therefore and as a light stabilizer from 0.5 to 2.0 percent, based on the total weight of the polymer solution, of a compound taken from the group consisting of alkyl C-substituted pyridines and aromatic C-substituted pyridines.

7. A new composition of matter comprising a polymer blend of 80 to 98 percent of (A) a copolymer containing 80 to 98 percent of acrylonitrile and 2 to 20 percent of vinyl acetate and 1 to 20 percent of (B) a copolymer containing 10 to 70 percent of acrylonitrile and 30 to 90 percent of 2-methyl-5-vinylpyridine, said blend being so proportioned that the 2-methyl-5-vinyl-pyridine comprises from 2 to 10 percent by weight of blend, dissolved in a solvent therefore, and as a light stabilizer, from 0.05 to 5.0 percent 2-methyl-5-ethyl pyridine based on the weight of the polymer.

8. A fiber prepared from an acrylonitrile copolymer containing at least 80 percent acrylonitrile and up to 20 percent of at least one other mono-olefinic monomer containing, as a light stabilizing agent, from 0.025 to 2.0 percent, based on the weight of the polymer, of a compound taken from the group consisting of alkyl C-substituted pyridines having 1 to 12 carbon atoms in the substituents and aromatic C-substituted pyridines having 6 to 12 carbon atoms in the substituents.

9. A fiber prepared from an acrylonitrile copolymer containing at least 80 percent acrylonitrile and up to 20 percent of at least one other mono-olefinic monomer containing, as a light stabilizing agent, from 0.1 to 1.0 percent, based on the weight of the polymer of 2-methyl-5-ethyl pyridine.

10. A method for preparing a light stabilized acrylonitrile polymer fiber comprising mixing a polymer containing in polymerized form at least 80 percent of acrylonitrile and up to 20 percent of at least one copolymerized mono-olefinic monomer, a solvent therefor, heating the mixture to a temperature in the range of 25° C. to the boiling point of the mixture to form a homogeneous solution, spinning the solution into a coagulation bath, immersing the resultant fiber in a finish bath, with from 0.05 to 5.0 percent, based on fiber weight, of a light stabilizing compound taken from the group consisting of alkyl C-substituted pyridines having 1 to 12 carbon atoms in the substituents and aromatic C-substituted pyridines having 6 to 12 carbon atoms in the substituents added after polymerization.

11. The method defined in claim 10 wherein the light stabilizing compound is added to the polymer solution.

12. The method defined in claim 10 wherein the light stabilizing agent is added to the finish bath.

13. The method defined in claim 10 wherein the acrylonitrile polymer is a copolymer comprising at least 80 percent of acrylonitrile and up to 20 percent of vinyl acetate.

14. The method defined in claim 10 wherein the copolymerized mono-olefinic monomer is vinyl acetate.

15. The method defined in claim 10 wherein the acrylonitrile polymer comprises a polymer blend of 80 to 99 percent of (A) a copolymer containing 80 to 98 percent of acrylonitrile and 2 to 20 percent of another copolymerized mono-olefinic monomer and (B) a copolymer containing 10 to 79 percent of acrylonitrile and 30 to 90 percent of a vinyl-substituted tertiary heterocyclic amine, said blend having an overall vinyl-substituted tertiary heterocyclic amine content of from 2 to 10 percent based on the weight of the blend.

16. The method defined in claim 15 wherein the vinyl-substituted tertiary heterocyclic amine is 2-methyl-5-vinylpyridine.

References Cited in the file of this patent
UNITED STATES PATENTS

| | | |
|---|---|---|
| 2,654,679 | Goppel et al. | Oct. 6, 1953 |
| 2,719,834 | Craig et al. | Oct. 4, 1955 |
| 2,835,647 | Schulken et al. | May 20, 1958 |
| 2,971,002 | Feely | Feb. 7, 1961 |